June 7, 1960 R. L. WURGAFT 2,939,572
HAND-OFF DEVICE

Filed Sept. 29, 1958 2 Sheets-Sheet 1

INVENTOR.
ROBERT L. WURGAFT
BY C. F. Stratton
ATTORNEY

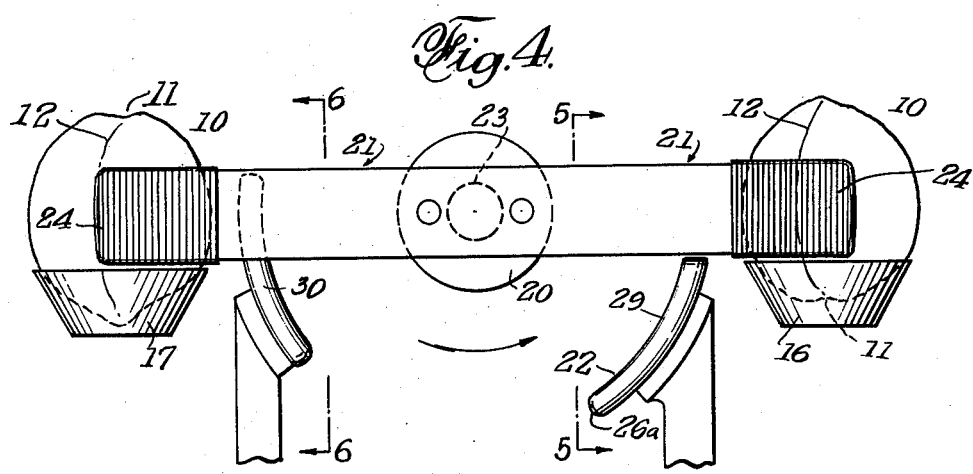
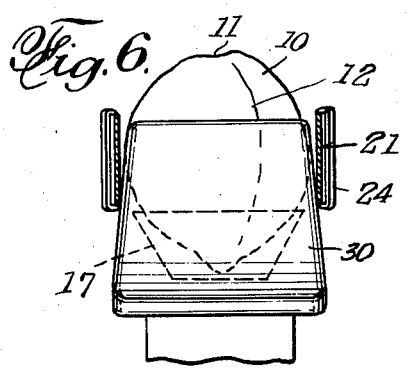
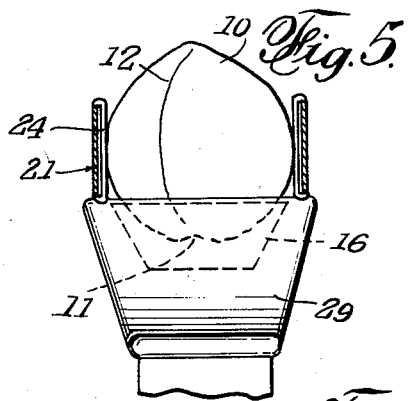
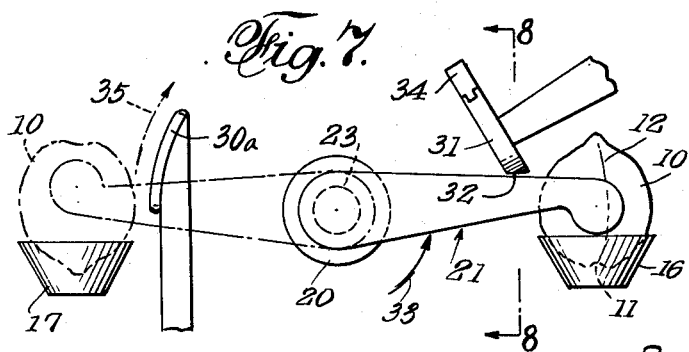
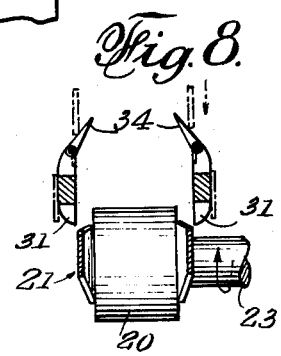

United States Patent Office 2,939,572
Patented June 7, 1960

2,939,572
HAND-OFF DEVICE
Robert L. Wurgaft, 319 N. Palm St., Anaheim, Calif.
Filed Sept. 29, 1958, Ser. No. 763,927
3 Claims. (Cl. 198—210)

This invention relates to a hand-off or transfer device.

In fruit-handling machines and particularly in machines for orientating fruit, such as peaches, apricots, nectarines, etc. so that the same may be properly halved for canning purposes, it is essential that the fruit-halving blades cut the fruit along the seams thereof and through the seat that had been occupied by the stem of the fruit. Thus, orientating entails, first, aligning the fruit so that the stem depressions are all in the same direction and, then, aligning the stem-aligned fruit so that all of the seams stand the same way when the fruit is being halved.

An object of the present invention is to provide novel and improved mechanism for transferring fruit that has been stem-aligned to a seam-aligning means, the same constituting a hand-off device that always delivers the fruit to rotational seam-aligning means with the stem seats on the axis of the rotation of the latter means.

Another object of the invention is to provide hand-off means that effects a fruit transfer that is carried out in an arcuate path.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes, preferred embodiments of the present invention, which are given by way of illustration or example only.

In the drawings, like reference characters designate similar parts in the several views.

Fig. 4 is a front view of another form of hand-off device.

Figure 1:
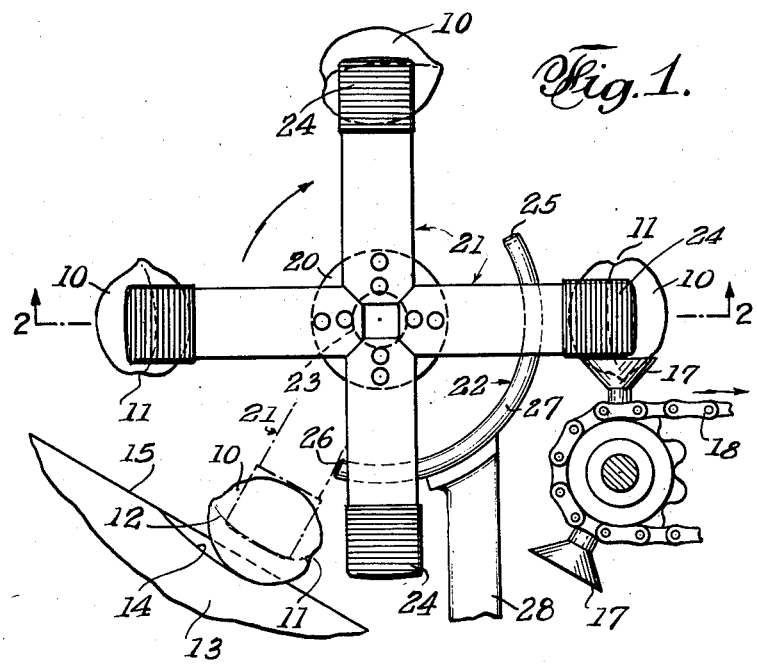
Fig. 1 is a front view of a preferred form of transfer or hand-off device, embodying features of the present invention.

Figs. 5 and 6 are cross-sectional views as taken on lines 5—5 and 6—6, respectively, of Fig. 4.

Fig. 7 is a front view of still another form of hand-off device according to the present invention.

Fig. 8 is a cross-sectional view as taken on the line 8—8 of Fig. 7.

It will be understood that the present device is adapted to handle items of fruit 10 which have oval type stem cavities or recesses 11 and a seam 12, at least on one side of the fruit and normally aligned with the long dimension of the recess 11.

Orientating machines for fruit of this nature include stem-aligning mechanism and seam-aligning mechanism. In the drawings, the member 13 represents a part of a stem-aligning mechanism that, in a seat 14, holds an item of fruit in a predetermined manner. Thus, in this case, the seam 12 is disposed longitudinally, i.e., parallel to the face 15 of the stem-aligning mechanism, with the recess 11 at one end, as shown. In Figs. 4 and 7 the seat 14 is omitted and instead, the seam-aligning means is provided with a set or series of fruit-holding cups 16 which bring the fruit with their stem recesses 11 and seams 12 in position comparable to the position of the fruit in recess or seat 14.

The seam-aligning mechanism is here characterized by a fruit-receiving cup 17, the present hand-off mechanism transferring fruit 10 from the stem-aligning means to said cup and to other similar cups as the same are moved, in the direction shown, by an endless chain 18, for instance. Once in said cup, the fruit and cup, together, are turned by the seam-aligning mechanism to bring the seam 12 to desired alignment, preparatory to halving of the fruit.

The present hand-off mechanism comprises, generally, a driven member 20, fruit-gripping arms 21 carried by said member 20 and movable thereby between either the seat 14 or a cup 16 and a receiving cup 17, and means 22 to control said arms 21 to spread and contract them between fruit-gripping and fruit-releasing positions.

Figure 2:
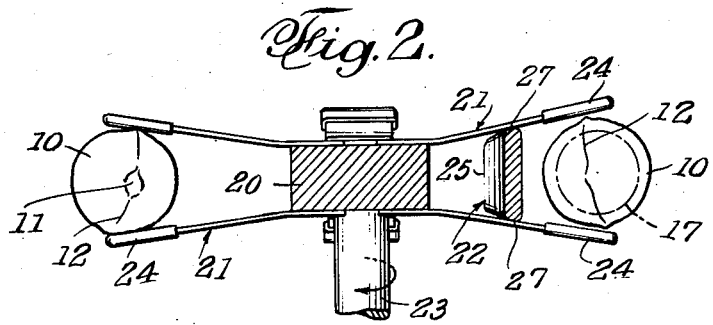
Fig. 2 is a cross-sectional view as taken on line 2—2 of Fig. 1.
Figure 3:
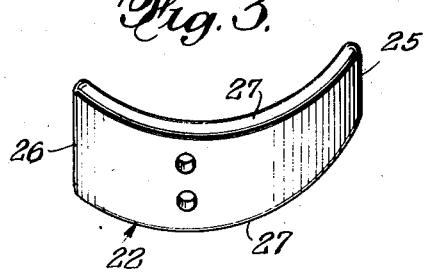
Fig. 3 is a perspective view of a spreader detail of the present invention.

In the form of Figs. 1, 2 and 3, the member 20 is shown as a hub on a continuously rotating shaft 23.

The arms 21 are formed as flat spring blades or paddles fastened to opposite faces of the hub and extending radially therefrom. Said arms are shown with ends 24 that are rubberized for the two-fold purpose of improving their grip on the fruit and minimizing bruising of the fruit. Regardless how the arms are secured to the hub, the same seek an unflexed condition generally parallel to each other and spaced closer together than the diameter of the fruit they are to handle. The fruit-gripping condition of the arms will have the same spread or diverged at the rubberized ends 24, as best seen in Fig. 2 at the left. Further spreading of the arms will cause the same to release fruit that is being gripped. This condition is shown in Fig. 2 at the right.

In the form of Fig. 1, four pairs of arms are used, the same successively effecting transfer of fruit from the seat 14 to a cup 17.

The means 22 is shown as a spreader cam that has a small end 25, a wide or large end 26, and connecting sloping edges 27 between said ends. Said cam is curved, as shown, and is fixedly positioned, as by a bracket 28, to have its curvature generated on the axis of hub 20. Said cam is positioned between the arms 21 so that, during rotation of the latter, they engage the cam edges 27 and are spread thereby according to the divergence of the cam edges.

Assuming a pair of arms 21 engaged by the widest part of the spreader cam, as is the pair of arms in the lower part of Fig. 1, upon movement of said pair of arms in a clockwise direction, said arms, from a fully spread condition, move off the end 26 of the cam and snap toward each other to gripping engagement with an item of fruit 10 in the seat 14. Since the fruit had been stem-orientated, the arms, as they continue to move around the axis of the hub 20, carry the fruit around until the small end 25 of the spreader cam intrudes between the arms. Now, as the fruit reaches a cup 17 of the seam-aligning means, the diverging cam edges 27 spread the arms to cause the same to release the fruit. Thus, spread and further spread as the arms move along the increasingly widening cam, the empty arms move toward a fruit-gripping position as above. The cycle of operation is, then, repeated.

It will be noted that the cam-supporting bracket 28 is provided in that part of the device where there is no fruit between the arms. Also, that, after depositing the fruit in a cup 17, the arm ends 24 pass by the cup because held spread by the cam 22.

In the modification of Figs. 4, 5 and 6, but two pairs of arms 21 are used; the member 13 is replaced by a cup 16 that brings an item of fruit 10 stem-aligned to a position where a pair of arms 21 may drop off the end 26a of a release portion 29 of the means 22. A spreader portion 30 of said means 22 is so associated with the arms that, as an item of fruit reaches the receiving cup 17, the same spreads the arms as before described.

It will be clear that in the above-described two forms of the invention, the stem orientation of the fruit is retained although the same is inverted during hand-off from member 13 or cup 16 to cup 17.

The same relationship is retained in the modification of Figs. 7 and 8 in which the rotational movement in the same direction on the axis of hub 20 is changed to an oscillating movement of one pair of arms 21. In this case, the means 22 comprises spreader cams 31 from the ends 32 of which the spread arms drop off to grip an item of fruit in cup 16. When the arms 21 move in the direction of arrow 33, they are contracted against the opposite sides of the fruit and, therefore, pass freely between the cams 31 and past hinged portion 34 of said cams. The latter swing out and then back to their inward position, as shown.

The arms 21 transport the fruit to cup 17 where a cam 30a spreads the arms to cause the same to release the fruit to fall into said cup 17. Since the arms 21 oscillate on the axis of hub 20, they return toward cup 11 in the direction of arrow 35. Said arms will be spread, first, by the hinged portions 34, and then by the outer surfaces of the cams 31 to snap over an item of fruit in the next cup 16 brought to the delivery position at the right of Fig. 7. Thereafter, the cycle of operation repeats itself.

While the foregoing specification illustrates and describes what I now contemplate to be the best modes of carrying out my invention, the constructions are, of course, subject to modification without departing from the spirit and scope of my invention. Therefore, I do not desire to restrict the invention to the particular forms of construction illustrated and described, but desire to cover all modifications that may fall within the scope of the appended claims.

Having thus described by invention, what I claim and desire to secure by Letters Patent is:

1. In combination, means having an elongated fruit-holding seat for holding a single fruit unit with the stem end thereof in predetermined alignment longitudinally in said seat; a series of travelling fruit-orienting and -holding cups in coplanar alignment with the seat of the fruit-holding means; a rotating axle transverse to the plane of alignment, a set of uniformly spaced pairs of spring arms mounted radially on the axle, said pairs of arms being biased toward each other and equally toward said plane of alignment; and cam means comprising an arcuately curved plate having opposite cam edges that diverge from one end of the cam plate to the other end, the axle rotating in a direction to bring the pairs of arms, first, from a position gripping a fruit unit in the mentioned recess, then, to a position with the narrow end of the cam plate between the fruit-carrying pair of arms, then, to a position with the arms spread by the diverging cam edges and the fruit released by said spread arms disposed and oriented in a cup of the mentioned series thereof, and, finally, to a position engaged by the widest end of the cam plate and fully spread so that the space therebetween is greater than a fruit unit that replaced the unit removed from the mentioned seat, the spread arms closing over the latter unit upon release by the cam plate upon return to said arms to initial fruit-gripping position.

2. The combination according to claim 1 in which the fruit-engaging ends of the arms are covered by non-bruising and friction-increasing material to insure a non-movable gripping of the fruit by the pairs of arms as the same is being transferred.

3. The combination according to claim 1 in which the seat is provided with an arcuate extension that is formed on a curvature generated around the center of the axle, said extension being directed away from the wider end of the cam plate.

References Cited in the file of this patent
UNITED STATES PATENTS
375,036   Williams _____ Dec. 20, 1887